Patented Mar. 23, 1954

2,673,140

UNITED STATES PATENT OFFICE 2,673,140

PRODUCTION OF HYDROGEN PEROXIDE

Jerome W. Sprauer, Niagara Falls, N. Y., assignor to E. I. du Pont de Nemours and Company, Wilmington, Del., a corporation of Delaware No Drawing. Application November 29, 1951, Serial No. 258,983

7 Claims. (Cl. 23—207)

This invention relates to the production of hydrogen peroxide by the alternate hydrogenation of 2-t-butylanthraquinone and oxygenation of the resulting 2-t-butylanthrahydroquinone to reform the anthroquinone, which is recycled after separation of the hydrogen peroxide formed simultaneously.

Cyclic processes of the above type employing alkylanthraquinone intermediates dissolved in suitable solvents have been previously proposed. In such processes, the oxygenation reaction is effected non-catalytically using air or gaseous oxygen, whereas the hydrogenation reaction is effected catalytically employing gaseous hydrogen and a hydrogenation catalyst. It is essential that the hydrogenation catalyst be completely separated from the working solution before the latter is passed to the oxidation stage, e. g., by forcing the solution through a suitable filter. Generally, hydrogenation has been effected at a pressure somewhat above atmospheric pressure, e. g., at about 2 to 3 atmospheres, to assure a pressure differential sufficient for the filtering operation.

2-t-butylanthroquinone is an outstanding intermediate for use in such processes because the unusually high solubilities of its quinone and hydroquinone forms in suitable solvents permit the production of relatively large amounts of hydrogen peroxide per cycle. In continuous operations, this compound is converted to a substantial extent to tetrahydro-2-t-butylanthraquinone. This derivative also produces hydrogen peroxide in the cycle, but it is much less soluble than the parent compound. Under the hydrogenation conditions heretofore proposed, the conversion to this tetrahydro derivative occurs progressively and when concentrated working solutions are employed with continuous recycling, precipitation of the tetrahydro derivative eventually results. Since precipitation of solids must be avoided in practical operations, such progressive conversion to a less soluble compound has constituted a serious obstacle to the use of 2-t-butylanthraquinone in processes of the above type.

The rate of conversion to the above tetrahydro derivative can be retarded somewhat by effecting hydrogenation so as to convert only part, e. g., 40 to 70%, of the anthraquinone compounds (generally both 2-t-butylanthraquinone and tetrahydro-2-t-butylanthraquinone will be present) to the corresponding anthrahydroquinones. Although advantageous, such a practice alone does not successfully prevent undesired continued conversion to the tetrahydro compound and precipitation eventually results when sufficiently concentrated working solutions are employed.

It is an object of the invention to provide a method for controlling the extent to which 2-t-butylanthraquinone will be converted to tetrahydro-2-t-butylanthraquinone in cyclic processes of the above type. A particular object is to provide an improved method of hydrogenating the working solution in such a process whereby the conversion to the above tetrahydro derivative is effectively controlled so as to avoid precipitation thereof, despite the use of concentrated working solutions and the repeated recycling thereof over long periods of time. Still further objects will be apparent from the following description.

In practicing the present invention, 2-t-butylanthraquinone dissolved in a suitable solvent is employed as the starting intermediate in a continuous cyclic process of the above type for producing hydrogen peroxide. The starting working solution may contain both the anthraquinone and its tetrahydro derivative, but the concentration of the latter should never exceed the maximum concentration which can be tolerated without precipitation of the tetrahydro derivative occurring in the oxydized solution. The objects of the invention are accomplished by hydrogenating the oxygenated working solution, from which hydrogen peroxide has been separated, to a hydrogenation level not exceeding 70% of theoretical, i. e. to a level corresponding to a hydrogen absorption not greater than 70% of that theoretically required for complete conversion of all anthraquinone compounds present to the corresponding anthrahydroquinones, employing hydrogen at a gas phase hydrogen pressure not exceeding 0.9 atmosphere, e. g., 0.5 to 0.85 atmosphere.

It appears that the following reversible reactions are involved in the hydrogenation stage of the present process:

A. 2-t-butylanthroquinone+$H_2$⇌2-t-butylanthrahydroquinone.
B. 2-t-butylanthrahydroquinone+$2H_2$⇌tetra-2-t-butylanthrahydroquinone.

It also appears from the fact that both 2-t-butylanthraquinone and 2-t-butylanthrahydroquinone can be substantially completely hydrogenated to tetrahydro-2-t-butylanthrahydroquinone at a gas phase hydrogen pressure of 1 atmosphere, that the above indicated equilibria can be attained or approached at a permissible tetrahydro concentration in the oxygenated solution, only at a hydrogen pressure at the catalyst surface which is very low and far below 1 atmosphere. Thus, in the hydrogenation stage of a continuous system there exists a dynamic difference between the gas phase hydrogen pressure and the hydrogen pressure at the catalyst surface. The pressure at the catalyst surface must not exceed an unknown maximum value, otherwise the equilibria indicated above are not attained until the concentration of the tetrahydro derivative increases to substantially complete conversion. Even though the maximum pressure at the catalyst surface which must not be exceeded in order that dynamic equilibrium may be reached at a permissible tetrahydro derivative concentration remains unknown, it has been found, surprisingly, that as a practical matter such equilibrium can be obtained by employing hydrogen at a gas phase hydrogen pressure not exceeding 0.9 atmosphere.

A further requirement is that the hydrogenation level in the hydrogenation stage be restricted to not more than 70% of theoretical. Preferably, hydrogenation will be carried out to a level of 40 to 65% of theoretical. Hydrogenation can be readily restricted to such levels by withdrawing working solution from the hydrogenator either continuously or periodically before the amount of hydrogen absorbed has exceeded the stated values.

The maximum concentration of the tetrahydro compound which will be reached in the system will depend to some extent on the activity of the catalyst and the efficiency of the hydrogenating equipment at the chosen production rate; it will depend chiefly upon the concentration of 2-t-butylanthraquinone in the starting solution, the hydrogenation level and the gas phase hydrogen pressure employed. It has been found that when using practical concentrations of the anthraquinone, the concentration of the tetrahydro derivative can be simply and effectively controlled so as never to exceed the permissible maximum by controlling both the hydrogenation level and the gas phase hydrogen pressure as indicated. Thus, at gas phase hydrogen pressures less than 0.9 atmosphere, preferably 0.5 to 0.85 atmosphere, the maximum concentration of tetrahydro derivative that can be produced will never exceed the solubility of the compound in the system regardless of the starting concentration of 2-t-butylanthraquinone, provided the hydrogenation level is restricted as indicated.

The invention may be practiced to control conversion to the tetrahydro derivative in working solutions of any practical concentration. Preferably, the working solution will contain such amounts of the anthraquinone (including any tetrahydroanthraquinone present) that upon being hydrogenated to the chosen hydrogenation level, the content of anthrahydroquinone (including any tetrahydroanthrahydroquinone present) will be at least 0.2 mole, e. g., 0.25 to 0.35 mole, per liter.

The quinone form of the tetrahydro derivative is less soluble than its hydroquinone form so that it is the solubility of the former which determines the maximum permissible concentration of the tetrahydro derivative. It has been found that at anthraquinone concentrations corresponding to hydroquinone concentrations within the ranges indicated above for operations at hydrogenation levels not exceeding 70%, the oxygenated working solution can tolerate a mole ratio of tetrahydroanthraquinone to anthraquinone up to about 1 without precipitation occurring, and that when practicing the present invention that ratio will never be exceeded. By employing a gas phase hydrogen pressure not exceeding 0.9 atmosphere, e. g., 0.5 to 0.85, in accordance with the invention, the mole ratio of the above two compounds will generally not exceed 0.8. If this ratio tends to become higher than desired, it can be reduced by further reducing the gas phase hydrogen pressure during hydrogenation.

There appears to be no critical lower limit to the gas phase hydrogen pressures that can be used. However, as the pressure is decreased below about 0.3 atmosphere the rate of hydroquinone formation decreases progressively and may be too slow for practical purposes. Surprisingly, it has been found that the rate of hydroquinone formation is substantially the same at gas phase hydrogen pressures of 0.5 to 0.9 atmosphere as at 2 to 3 atmospheres.

The gas phase hydrogen pressure may be limited in accordance with the present invention in any convenient manner. Pure hydrogen may be used at a gas phase pressure of 0.3 to 0.9 atmosphere. However, in order to avoid operation of a hydrogen filled reactor under partial vacuum, it is preferred to employ a mixture of hydrogen and an inert gas at a total pressure exceeding atmospheric, employing a mixture containing such an amount of hydrogen as will result in a gas phase partial pressure of hydrogen not exceeding 0.9 atmosphere. Thus, in a preferred modification of the invention, hydrogenation is carried out employing a gas mixture containing, by volume, 15 to 45% hydrogen and 85 to 55% nitrogen at a total gas pressure of about 2 atmospheres. If the total gas pressure is increased, the hydrogen content of the gas mixture must be decreased; conversely, if the mixture of gases is employed at a lower total pressure, the hydrogen content of the mixture may be increased. In any case, the partial pressure of hydrogen in the gas mixture should not exceed 0.9 atmosphere. Any gas which is inert towards all constituents of the working solution may be employed along with hydrogen in such gas mixtures. The preferred inert gas is nitrogen.

The invention is illustrated by the following examples.

*Example 1*

A working solution containing initially about 20% 2-t-butylanthraquinone, 52% 1-methylnaphthalene and 28% by weight diisobutyl carbinol was employed in a cyclic process of the type described above. In the process, the working solution was continuously withdrawn through a filter from the hydrogenator and passed to the oxygenator. It was also continuously withdrawn from the oxygenator, continuously extracted with water to separate hydrogen peroxide, and the working solution from the extractor was continuously recycled to the hydrogenator. The rates at which the solution were passed to and withdrawn from the hydrogenator were so controlled as to produce a hydrogenated solution containing about 0.25–0.30 mole per liter of anthrahydroquinone compounds, corresponding to a hydrogenation level of about 35 to 55%. A catalyst comprising metallic palladium supported on activated alumina and containing 0.4 to 0.9% Pd by weight was added to the hydrogenator and spent catalyst was simultaneously withdrawn at such rates as to maintain the hydrogenator productivity. The catalyst concentration in the hydrogenator was usually within the range 6 to 10% of the weight of the working solution. The hydrogenating gas consisted of a mixture of hydrogen and nitrogen containing about 35–40% hydrogen by volume. It was used at a total gas pressure of about 2 atmospheres. During the first 2½ months of operating, the ratio of tetrahydro-2-t-butylanthraquinone to 2-t-butylanthraquinone in the recycled oxygenated solution gradually increased to about 0.65. During a further 2 months period of continuous operation this ratio increased slightly but finally leveled out so as never to exceed 0.8. During the 4½ months of operation, hydrogen peroxide was produced in amounts corresponding to 29 pounds of $H_2O_2$ per pound of the anthraquinone charged to the process.

*Example 2*

A working solution containing, by weight, 20% 2-t-butylanthraquinone, 35% 1-methylnaphthalene and 45% diisobutyl carbinol was employed in a continuous cyclic process for the production of hydrogen peroxide substantially as described in Example 1, except that the hydrogenation reaction was effected by means of hydrogen gas at a gas phase hydrogen pressure of about 2 atmospheres. After production of hydrogen peroxide in an amount corresponding to only 1.5 pounds of $H_2O_2$ per pound of anthraquinone charged to the process, the ratio of tetrahydro-2-t-butylanthraquinone to 2-t-butylanthraquinone had increased to 1.4 and precipitation of the tetrahydro derivative in the oxygenated solution resulted. This necessitated diluting the working solution with additional 1-methylnaphthalene.

The temperature at which the hydrogenation reaction is carried out is not critical and temperatures of around 20 to 40° C. are generally suitable. The oxygenation and hydrogen peroxide separation operations of the cyclic process can be carried out in any desired effective manner. It will generally be advantageous to carry them out under the conditions heretofore proposed for such operations, including the separation of hydrogen peroxide by aqueous extraction methods.

Any solvent or mixtures of solvents may be used for dissolving the anthraquinone intermediate so long as it is inert towards the intermediate compounds and the hydrogen peroxide. Preferably, the solvent will be water-immiscible and will comprise a mixture of solvents including a hydrocarbon solvent, such as benzene or the like, and a higher alcohol. The most preferred solvents are those consisting of a mixture of an alkyl substituted naphthalene, e. g., 1-methylnaphthalene, and a primary or secondary nonyl alcohol, such as diisobutyl carbinol, as disclosed in the copending application of Harris and Sprauer, Serial No. 125,847, filed November 5, 1949. With such solvents, working solutions may be obtained which permit operation at an alkylanthrahydroquinone concentration in the range of 0.2 to 0.35 mole per liter in the solution withdrawn from the hydrogenator, which concentration will represent a hydrogenation level not exceeding 70% of theoretical.

Any hydrogenation catalyst which is active to promote the reactions involved may be used. Examples are finely divided metallic nickel catalysts, such as Raney nickel, and a palladium catalyst containing metallic palladium on an activated alumina carrier. The latter is the preferred catalyst.

I claim:

1. In a cyclic process for producing hydrogen peroxide by alternately catalytically hydrogenating a solution comprising 2-t-butylanthraquinone dissolved in a suitable solvent and oxygenating the resulting solution to reform said 2-t-butylanthraquinone which is recycled after separating the hydrogen peroxide simultaneously formed, the improvement comprising carrying out the hydrogenation reaction at a gas phase hydrogen pressure not exceeding 0.9 atmosphere while restricting the amount of hydrogen absorbed to not more than 70% of the amount theoretically required to convert all anthraquinone compounds present to the corresponding anthrahydroquinone compounds.

2. The method of claim 1 wherein the hydrogenation reaction is carried out at a gas phase hydrogen pressure of 0.3 to 0.9 atmosphere.

3. The method of claim 2 wherein the hydrogenation reaction is carried out employing a mixture of hydrogen and nitrogen at a total gas phase pressure in excess of 1 atmosphere.

4. The method of claim 1 wherein the hydrogenation reaction is carried out at a gas phase hydrogen pressure of 0.5 to 0.85 atmosphere.

5. The method of claim 1 wherein the hydrogenation reaction is carried out employing a mixture of hydrogen and an inert gas at a total gas phase pressure in excess of 1 atmosphere.

6. The method of claim 1 wherein the hydroquinone concentration of the working solution from the hydrogenation stage is at least 0.2 mole per liter.

7. The method of claim 6 wherein the hydroquinone concentration is 0.25 to 0.35 mole per liter.

JEROME W. SPRAUER.

References Cited in the file of this patent

UNITED STATES PATENTS

| Number | Name | Date |
|---|---|---|
| 2,059,569 | Filson et al. | Nov. 3, 1936 |
| 2,369,912 | Pfleiderer et al. | Feb. 20, 1945 |
| 2,455,238 | Dawsey et al. | Nov. 30, 1948 |